(12) United States Patent
Hofer

(10) Patent No.: US 10,407,106 B2
(45) Date of Patent: Sep. 10, 2019

(54) SILL PANEL FOR A MOTOR VEHICLE

(71) Applicant: MAGNA STEYR Fahrzeugtechnik AG & Co KG, Graz (AT)

(72) Inventor: Bernhard Hofer, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 15/875,002

(22) Filed: Jan. 19, 2018

(65) Prior Publication Data

US 2018/0222530 A1    Aug. 9, 2018

(30) Foreign Application Priority Data

Feb. 9, 2017  (EP) .................................... 17155394

(51) Int. Cl.
*B62D 25/02* (2006.01)
*B62D 65/02* (2006.01)
*B62D 27/02* (2006.01)
*B62D 25/20* (2006.01)
*B62D 29/00* (2006.01)

(52) U.S. Cl.
CPC ....... *B62D 25/025* (2013.01); *B62D 25/2036* (2013.01); *B62D 27/026* (2013.01); *B62D 65/02* (2013.01); *B62D 29/008* (2013.01)

(58) Field of Classification Search
CPC ............. B62D 25/025; B62D 25/2036; B62D 27/026; B62D 65/02

USPC ........................................................... 296/209
See application file for complete search history.

(56) References Cited

U.S. PATENT DOCUMENTS

| 6,168,226 B1 * | 1/2001 | Wycech | B29C 44/1228 |
| | | | 180/68.4 |
| 2014/0327274 A1 * | 11/2014 | Baldwin | B62D 25/025 |
| | | | 296/209 |
| 2016/0039465 A1 * | 2/2016 | Hofer | B62D 27/02 |
| | | | 296/193.01 |
| 2016/0229456 A1 * | 8/2016 | Boettcher | B62D 25/025 |
| 2018/0009481 A1 * | 1/2018 | Lee | B62D 21/157 |

FOREIGN PATENT DOCUMENTS

| DE | 102005038463 A1 | 2/2007 |
| DE | 60219275 T2 | 1/2008 |
| DE | 102014206002 A1 | 10/2015 |
| EP | 1238895 A2 | 9/2002 |

* cited by examiner

*Primary Examiner* — Jason S Morrow
(74) *Attorney, Agent, or Firm* — Jordan IP Law, LLC; Todd A. Vaughn

(57) ABSTRACT

A sill for a motor vehicle, a method for producing a sill, and a method for producing a motor vehicle. The sill includes a sill profile having at least one longitudinal recess, and a reinforcing body having at least one longitudinal tab configured for receipt into the at least one longitudinal recess to connect the reinforcing body to the sill profile.

20 Claims, 2 Drawing Sheets

SILL PANEL FOR A MOTOR VEHICLE

CROSS-REFERENCE TO RELATED APPLICATIONS

The present application claims priority under 35 U.S.C. § 119 to European Patent Application No. EP 17155394.4 (filed on Feb. 9, 2017), which are each hereby incorporated by reference in their respective entirety.

TECHNICAL FIELD

Embodiments relate to a sill for a motor vehicle, a method for production of a sill, and a method for production of a motor vehicle comprising such a sill.

BACKGROUND

It is known to form a sill for a motor vehicle, i.e., a body component arranged on both sides in the floor region of a motor vehicle, by a sill profile extending in a longitudinal direction. A "sill profile" here means a profile, typically a hollow profile, which forms the main part of the sill. The sill profile may be formed by an integral hollow profile or be constructed for example from two assembled profile parts which together form a hollow profile.

In recent times, sill profiles made of aluminium have been used to produce a body in lightweight construction. Such sill profiles are admittedly light but only have a slight extensibility and, in particular, under a side impact on the sill, break more easily than for example sill profiles made from steel.

Therefore, attempts have been made to combine the advantages of the different materials, in that a sill comprises both components made of aluminium and components made of steel.

For example, German Patent Publication No. DE 10 2014 200 598 B3 discloses a body component for a motor vehicle, in particular, a side sill, which has a closed hollow profile and is constructed from at least two sheet metal shells which are fixedly connected together by weld connections at their bent edge flanges, and provided with at least one reinforcing insert arranged in the hollow profile to stiffen the component in the transverse and/or vertical directions (y, z), wherein the reinforcing insert is in play-free contact with opposing wall portions of at least one or both sheet metal shells and is welded thereto via spot weld connections, wherein the reinforcing insert is formed by two double-T profiles connected in the manner of a cross and each welded to opposing wall portions of the sheet metal shells in the transverse and vertical directions (y, z).

German Patent Publication No. DE 10 2013 004 852 A1 teaches a sill for a vehicle body with an elongate reinforcing component formed as a hollow profile and made from metal, preferably steel, and/or from plastic, preferably fibre-reinforced plastic, wherein the reinforcing component is constructed from a group of at least two, preferably at least three individual profiles. The individual profiles are here joined together to form a substantially rectangular hollow profile.

SUMMARY

In view of the above, embodiments are to specify a sill for a motor vehicle which is lightweight and has good crash properties. In particular, the energy occurring in a so-called "pillar impact" must be dissipated by the sill without this breaking. It is another object of the invention to specify a method for production of such a sill, and a method for production of a motor vehicle comprising such a sill.

This object is achieved by a sill for a motor vehicle, comprising a sill profile extending in a longitudinal direction, and a reinforcing body extending in the longitudinal direction, wherein the sill profile has at least one longitudinal recess, wherein the reinforcing body has at least one longitudinal tab, wherein the longitudinal tab is fixed in the longitudinal recess.

To achieve sufficiently good strength properties in an accident, in particular, a "pillar impact", a reinforcement composed of a stronger material such as steel, is attached to a sill profile which may be made from a lightweight material such as aluminium. The reinforcing body, however, at least primarily, is attached to the sill profile not via spot connections and not via welding, since the different materials typically have different thermal expansion coefficients and the components can distort on wear.

In accordance with embodiments, a recess extending in the longitudinal direction and a corresponding tab extending in the same longitudinal direction are used to create a secure connection between the components by insertion of the tab of the reinforcing body in the longitudinal recess of the sill profile, which connection can absorb a length compensation on different thermal expansion of the components. Such a connection of the two elongate components is less sensitive in relation to tolerances during production of the components and allows a shorter installation time. Also, the two components can be produced and painted separately and only thereafter joined together, whereby assembly is further simplified.

In accordance with embodiments, the sill profile may be an extruded profile. Alternatively, the sill profile may also be a casting.

The longitudinal recess, in particular, may be a longitudinal groove which thus has two opposing delimitation faces.

In accordance with embodiments, the longitudinal tab may be fixed in the longitudinal recess via adhesive, in particular, on both sides of the longitudinal tab which may each be bonded to one of the delimitation faces of the longitudinal groove. The adhesive may comprise an elastic assembly adhesive, in particular, an elastic two-component assembly adhesive, in order to ensure optimal absorption of the different thermal expansion rates of the materials.

In accordance with embodiments, the reinforcing body may comprise a different material from the sill profile, in particular, a stronger material.

In accordance with embodiments, the sill profile comprises a lightweight metal or a lightweight metal alloy, in particular, aluminium, and the reinforcing body comprises a heavy metal or heavy metal alloy, in particular, steel.

In accordance with embodiments, the reinforcing body may comprise a lightweight metal or lightweight metal alloy which may differ from the type of lightweight metal or lightweight metal alloy of the sill profile.

In accordance with embodiments, the sill profile has a rib structure on the inside. The reinforcing body is preferably inserted in the longitudinal recess of the extrusion from the outside.

In accordance with embodiments, the longitudinal tab may be formed at one end of the reinforcing body.

In accordance with embodiments, the reinforcing body is substantially a profile with U-shaped cross-section, so that the longitudinal tab is formed at one end of the cross-section of the reinforcing body and a further longitudinal tab is formed at the opposite second end of the cross-section of the reinforcing body, wherein the longitudinal tab is fixed in the longitudinal recess and the further longitudinal tab is fixed in a further longitudinal recess. The reinforcing body thus comprises two longitudinal tabs, and the sill profile comprises two longitudinal receivers, in particular, longitudinal grooves. However, more longitudinal tabs and more longitudinal receivers may be provided.

In accordance with embodiments, the reinforcing body may be substantially an angular profile, in particular, an angled plate. Such an angled plate may be, for example, a single steel sheet with a bent longitudinal tab, or also a rolled part.

The advantage of this arrangement is that the reinforcing body can easily be adapted to different vehicle models or derivatives constructed on the same platform. The reinforcing body may here make optimum use of the space available between the sill profile and a body outer skin. Furthermore, in this way it is possible to optimise the crash properties of the sill, and above all adapt to the respective vehicle model or derivative. Optimisation may be achieved in particular, by corresponding selection of material and form of the reinforcing body, in particular, by configuration of the reinforcing body with ribs and/or webs.

Furthermore, via shaping of the reinforcing body, it is possible to adapt the sill optimally to the outer contour of the respective vehicle model or derivative.

In accordance with embodiments, the reinforcing body may here also be formed as an extruded profile or casting.

In accordance with embodiments, outer body panelling may be attached to the reinforcing body, in particular, bonded superficially to an outside of the reinforcing body.

In accordance with embodiments, a method for production of a sill as described above may comprise at least one of: introducing the adhesive into the longitudinal recess of the sill profile, and thereafter, inserting the longitudinal tab of the reinforcing body in the longitudinal recess of the sill profile.

In accordance with embodiments, firstly the sill profile and the reinforcing body are painted separately from each other, then adhesive is introduced into the longitudinal recess of the sill profile and thereafter the longitudinal tab of the reinforcing body is inserted in the longitudinal recess of the sill profile.

In particular, on use of a sill profile and reinforcing body made of lightweight metal but from different alloys, for example, different aluminium alloys, painting in the strict sense of the word is omitted. The sill profile and/or reinforcing body may be coated with an oxide layer. Then the components are bonded as described.

In accordance with embodiments, if the reinforcing body has a plurality of longitudinal tabs and the sill profile has a plurality of longitudinal recesses, all longitudinal tabs may be inserted simultaneously in the longitudinal recesses of the sill profile which are already filled with adhesive.

The painting, in particular, dip-coating and/or cover-coating, can ensure better adhesion of the adhesive to the components, and painting may also improve the corrosion protection between the sill profile and reinforcing body.

After introduction of the adhesive into the longitudinal recess or recesses, the longitudinal tab or tabs of the reinforcing body may be pressed into the adhesive-filled recesses. Depending on choice of adhesive, it may not be necessary to secure the components while the adhesive sets, and further connecting devices such as bolts or rivets may be omitted.

In accordance with embodiments, a method for production of a motor vehicle comprising a sill as described hereinabove may provide for painting the sill profile, already attached to a body of the motor vehicle, together with the body, in particular, dip-coating and/or cover-coating, then introducing adhesive into the longitudinal recess of the painted sill profile, and thereafter, inserting the longitudinal tab of the reinforcing body in the longitudinal recess of the sill profile. The reinforcing body may here be painted or not painted.

DRAWINGS

Embodiments will be illustrated by way of example in the drawings and explained in the description below.

DESCRIPTION

Figure 1:
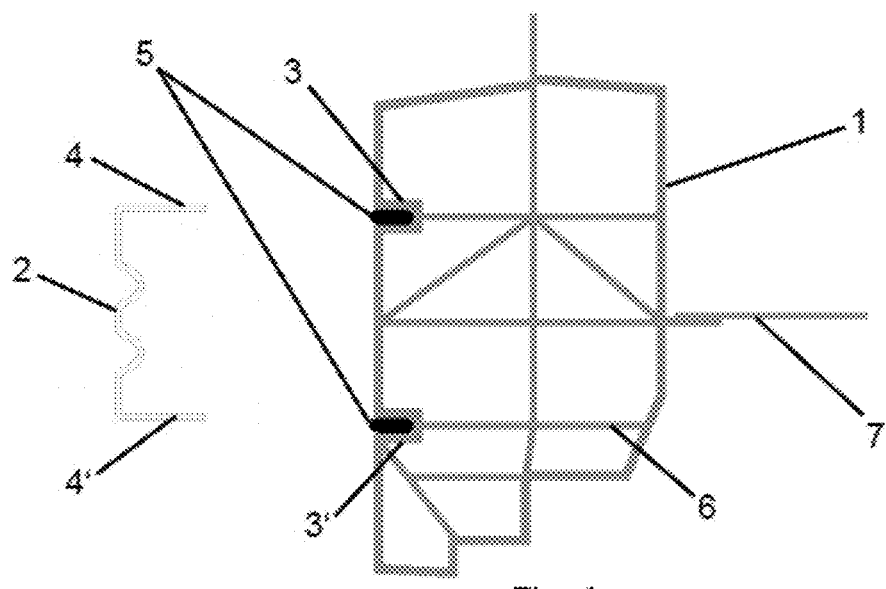
FIG. 1 illustrates a sectional view of a sill in which a reinforcing body is separate from the sill profile, in accordance with embodiments.
Figure 2:
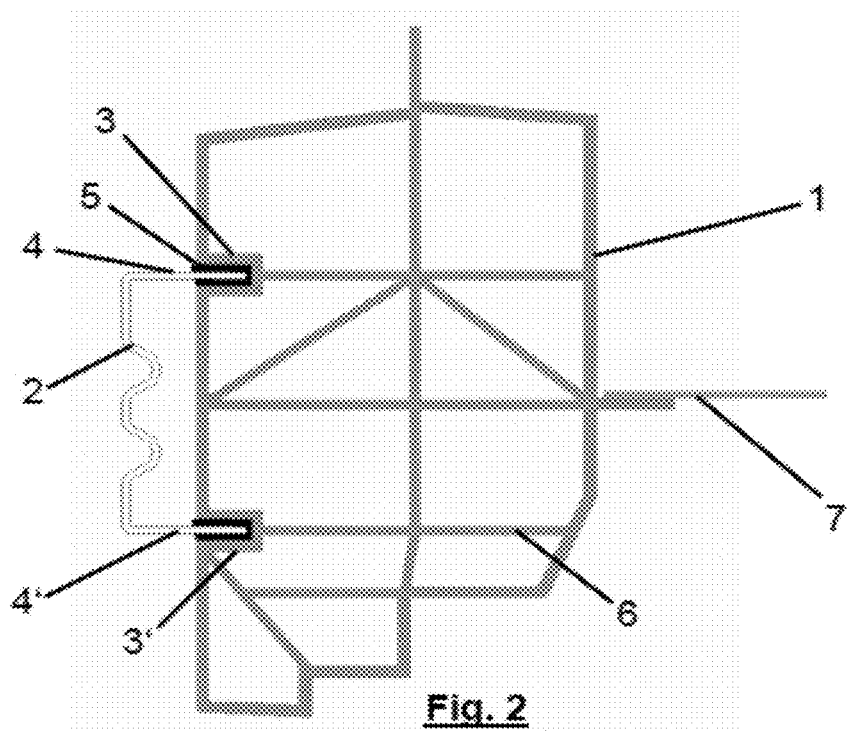
FIG. 2 illustrates a sectional view of the sill of FIG. 1, in which the reinforcing body is connected to the sill profile.

FIGS. 1 and 2 illustrate a sill for a motor vehicle, in accordance with embodiments. For better distinction of the components, in FIG. 1 the reinforcing body 2 is not connected to the sill profile 1, whereas FIG. 2 illustrates a usual state of the sill in which the reinforcing body 2 and the sill profile 1 are connected.

The sill profile 1 may be a metal (e.g., aluminium) extruded moulding extending in a longitudinal direction of the vehicle, with a rib structure 6 in the interior of the hollow body which connects together and thus, supports the side walls of the sill profile 1. The sill, namely the sill profile 1, is connected to a floor panel 7 on a side facing the interior of the vehicle, i.e., pointing towards a vehicle longitudinal centre line. On an opposite side of the sill pointing towards the outside, the reinforcing body 2 extending in the longitudinal direction and made of steel may be connected to the sill profile 1. On this outside of the sill, the sill profile 1 has a first longitudinal recess 3 and a second longitudinal recess 3', namely, two horizontally oriented longitudinal grooves extending in the longitudinal direction of the vehicle.

In accordance with embodiments, the reinforcing body 2 is a profile with substantially U-shaped cross-section, so that a first longitudinal tab or leg 4 is formed at one end of the cross-section of the reinforcing body 2, and a second longitudinal tab 4' is formed at the opposite second end of the cross-section of the reinforcing body 2. The longitudinal tabs 4, 4' are connected together via a vertically oriented centre part which is designed partially curved.

A two-component mounting adhesive with elastic properties is introduced as an adhesive 5 into both the first longitudinal recess 3 and the second longitudinal recess 3'. The first longitudinal tab 4 is bonded via the adhesive 5 into the longitudinal recess 3, and the second longitudinal tab 4' is bonded into the second longitudinal recess 3', thereby forming a connection between the sill profile 1 and the reinforcement body 2.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LISTING OF REFERENCE SYMBOLS

1 Sill profile
2 Reinforcing body
3 $1^{st}$ Longitudinal recess
3' $2^{nd}$ longitudinal recess
4 $1^{st}$ Longitudinal tab
4' $2^{nd}$ Longitudinal tab
5 Adhesive
6 Rib structure
7 Floor panel

What is claimed is:

1. A sill for a motor vehicle, the sill comprising:
a sill profile configured for connection to a floor panel of the motor vehicle, the sill profile having a first longitudinal recess extending in a longitudinal direction of the vehicle, and a second longitudinal recess extending in a longitudinal direction of the vehicle, the second longitudinal recess spaced apart from the first longitudinal recess; and
a reinforcing body having a center reinforcing body member and a pair of spaced apart longitudinal reinforcing body tabs that include a first longitudinal reinforcing body tab extending from the center reinforcing body member for receipt into the first longitudinal recess at a first connection region, and a second longitudinal tab extending from the center reinforcing body member for receipt into the second longitudinal recess to connect the reinforcing body to the sill profile at a second connection region.

2. The sill of claim 1, wherein the first longitudinal recess comprises a longitudinal groove.

3. The sill of claim 2, wherein the second longitudinal recess comprises a longitudinal groove.

4. The sill of claim 1, further comprising an adhesive for receipt in the first longitudinal recess to fix the first longitudinal reinforcing body tab in the first longitudinal recess at both sides of the first longitudinal reinforcing body tab.

5. The sill of claim 1, further comprising an adhesive for receipt in the second longitudinal recess to fix the second longitudinal reinforcing body tab in the second longitudinal recess at both sides of the second longitudinal reinforcing body tab.

6. The sill of claim 1, wherein:
the sill profile comprises a first material; and
the reinforcing body comprises a second material that is greater in strength than the first material.

7. The sill of claim 1, wherein:
the sill profile comprises a first material; and
the reinforcing body comprises a second material that has a different thermal expansion coefficient than the first material.

8. The sill of claim 1, wherein:
the sill profile comprises a lightweight metal or a lightweight metal alloy; and
the reinforcing body comprises a heavy metal or heavy metal alloy.

9. The sill of claim 1, wherein:
the sill profile comprises aluminum; and
the reinforcing body comprises steel.

10. A sill for a motor vehicle, the sill comprising:
a sill profile configured for connection to a floor panel of the motor vehicle, the sill profile having side walls defining a hollow interior, a plurality of ribs in the hollow interior to connect and support the side walls, a first longitudinal recess extending in a longitudinal direction of the vehicle, and a second longitudinal recess extending in a longitudinal direction of the vehicle, the second longitudinal recess spaced apart from the first longitudinal recess; and
a reinforcing body having a U-shaped cross-section with a center reinforcing body member having a partially curved cross-section, and a pair of spaced apart longitudinal reinforcing body tabs that include a first longitudinal reinforcing body tab extending from the center reinforcing body member for receipt into the first longitudinal recess at a first connection region, and a second longitudinal tab extending from the center reinforcing body member tab for receipt into the second longitudinal recess to connect the reinforcing body to the sill profile at a second connection region.

11. The sill of claim 10, wherein the first longitudinal recess comprises a longitudinal groove.

12. The sill of claim 11, wherein the second longitudinal recess comprises a longitudinal groove.

13. The sill of claim 10, further comprising an adhesive for receipt in the first longitudinal recess to fix the first longitudinal reinforcing body tab in the first longitudinal recess at both sides of the first longitudinal reinforcing body tab.

14. The sill of claim 10, further comprising an adhesive for receipt in the second longitudinal recess to fix the second longitudinal reinforcing body tab in the second longitudinal recess at both sides of the second longitudinal reinforcing body tab.

15. The sill of claim 10, wherein:
the sill profile comprises a first material; and
the reinforcing body comprises a second material that is greater in strength than the first material.

16. The sill of claim 10, wherein:
the sill profile comprises a first material; and
the reinforcing body comprises a second material that has a different thermal expansion coefficient than the first material.

17. The sill of claim 10, wherein:
the sill profile comprises a lightweight metal or a lightweight metal alloy; and
the reinforcing body comprises a heavy metal or heavy metal alloy.

18. The sill of claim 10, wherein:
the sill profile comprises aluminum; and
the reinforcing body comprises steel.

19. A method for producing a sill for a motor vehicle, the method comprising:
  providing:
    a sill profile composed of a first material, the sill profile having a first longitudinal recess extending in a longitudinal direction of the vehicle, and a second longitudinal recess extending in a longitudinal direction of the vehicle, the second longitudinal recess spaced apart from the first longitudinal recess, and
    a reinforcing body composed of a second material that has a different thermal expansion coefficient than the first material, the reinforcing body having a center reinforcing body member, a first longitudinal reinforcing body tab extending from the center reinforcing body member and a second longitudinal tab extending from the center reinforcing body member spaced apart from the first longitudinal reinforcing body tab,
  introducing an adhesive into the first longitudinal recess and the second longitudinal recess; and
  forming a connection between the sill profile and the reinforcing body at a first connection region by inserting the first longitudinal reinforcing body tab into the first longitudinal recess, and a connection between the sill profile and the reinforcing body at a second connection region by inserting the second longitudinal tab into the second longitudinal recess.

20. The method of claim 19, further comprising, before introducing the adhesive, painting the sill profile and the reinforcing body separately from each other.

* * * * *